United States Patent
Hörtenhuber et al.

(10) Patent No.: US 6,988,603 B2
(45) Date of Patent: Jan. 24, 2006

(54) DISC-PACKET UNIT THAT CAN BE MOUNTED AND METHOD FOR MOUNTING THE SAME

(75) Inventors: Alfred Hörtenhuber, Stadi-Paura (AT); Gerhard Meier-Burkamp, Heidenheim (DE); Alexander Küruer, Steinheim (DE)

(73) Assignees: Voith Turbo GmbH & Co. KG, Heidenheim (DE); Miba Frictec GmbH, Vorchdorf (AU)

( * ) Notice: Subject to any disclaimer, the term of this patent is extended or adjusted under 35 U.S.C. 154(b) by 0 days.

(21) Appl. No.: 10/433,233

(22) PCT Filed: Sep. 20, 2002

(86) PCT No.: PCT/EP02/10558

§ 371 (c)(1),
(2), (4) Date: Aug. 22, 2003

(87) PCT Pub. No.: WO03/031123

PCT Pub. Date: Apr. 17, 2003

(65) Prior Publication Data

US 2004/0238309 A1 Dec. 2, 2004

(30) Foreign Application Priority Data

Oct. 2, 2001 (DE) .................................... 101 48 776

(51) Int. Cl.
*B25B 27/00* (2006.01)
*F16D 13/68* (2006.01)
*F16D 55/36* (2006.01)

(52) U.S. Cl. ............... 192/70.2; 192/70.28; 192/110 R; 192/115

(58) Field of Classification Search ............... 192/70.2, 192/70.28, 110 R, 115; 29/452, 462, 469, 29/274
See application file for complete search history.

(56) References Cited

U.S. PATENT DOCUMENTS

| 3,228,501 | A | * | 1/1966 | Eason et al. ............... 192/70.2 |
| 3,335,834 | A |   | 8/1967 | Wach ........................... 192/69 |
| 3,537,556 | A | * | 11/1970 | Culbertson et al. ....... 192/70.28 |
| 4,378,867 | A | * | 4/1983 | Pasqualucci ............. 192/70.13 |
| 4,564,994 | A | * | 1/1986 | Marx ........................... 29/468 |
| 4,910,856 | A | * | 3/1990 | Watanabe .................... 29/468 |
| 5,054,596 | A |   | 10/1991 | Taureg et al. ............. 192/58 B |
| 5,295,291 | A | * | 3/1994 | Harris ......................... 29/274 |
| 6,279,709 | B1 | * | 8/2001 | Orlamunder ............. 192/70.12 |
| 6,435,057 | B1 |   | 8/2002 | Korner et al. ............ 74/606 R |
| 6,553,643 | B2 | * | 4/2003 | Relan et al. .................. 29/464 |

FOREIGN PATENT DOCUMENTS

| DE | 39 27 584 | | 4/1990 |
| DE | 198 55 759 | | 11/2000 |
| JP | 01177979 A | * | 7/1989 |

* cited by examiner

*Primary Examiner*—Saul Rodriguez
(74) *Attorney, Agent, or Firm*—Baker & Daniels

(57) ABSTRACT

A disk-packet unit comprising a pre-tensioned disk packet for mounting on guide elements in a transmission component. The packet comprises at least two adjacent elements that form frictional surfaces, which can be intercoupled in a frictional engagement by means of an intermediate element that forms a frictional surface and comprises an auxiliary mounting device. At least one spring device is located between at least two adjacent elements that form frictional surfaces. The auxiliary mounting device comprises a sleeve element and a tensioning device. The elements that form frictional surfaces are carried on the sleeve element and the latter comprises a stop. The tensioning device can be detachably connected to the sleeve element and produces a force for pre-tensioning the disk packet.

23 Claims, 3 Drawing Sheets

DISC-PACKET UNIT THAT CAN BE MOUNTED AND METHOD FOR MOUNTING THE SAME

BACKGROUND OF THE INVENTION

The invention relates to a disk packet unit for the installation as multiple disk clutch or multiple-disk brake in a transmission component; furthermore a method for the mounting of a disk packet unit.

A transmission component with a gearbox is well known from publication DE 198 55 759 C1. In order to design the effective diameter of the internal gearbox elements larger as well as to ensure simple mounting and exchangeability of the individual gearbox elements, for example clutch devices and planet wheel sets, at least two rod-shaped guide elements, which extend in axial direction over at least a portion of the axial extension of the cylindrical interior space, are provided, at which a multiplicity of gearbox elements can be arranged stationary in relation to the housing. The rod-shaped guide elements are arranged in the cylindrical interior space outside of a range of the largest dimension of the cylindrical interior space in assembly position in direction of the height and are arranged in recesses in the gearbox, which are connected with the interior space. With this design it is necessary to mount each individual element of an individual gearbox element—for example a disk brake setting—successively on the guide element. It is to be considered however that when mounting external disks on the rod-shaped guide elements also the internal disks, for example on an internal gear or a profile shaft, must be mounted alternating. Mounting takes place as a single assembly of the individual elements, which is very complex without a special device. On the other hand however the use of a device means that first of all this device has to be particularly designed, built and manufactured for the desired installation case, which presupposes in particular for a multiplicity of disk units of different dimensions to be mounted a multiplicity of devices, which also are not universally applicable. A further problem is the exchangeability of defective wearing parts, in particular if these must be exchanged after a certain operation cycle, what requires an almost complete dismantling of all elements individually threaded on the rod-shaped guide elements. Mounting and dismantling expenditure is thus particularly high with this design. These actions also require a particularly careful procedure, in order to prevent scattering or an incorrect assembly of the parts, as forgotten or surplus parts can cause malfunctioning of the entire unit—brake device or clutch.

A method for inserting a disk packet into a clutch housing of a fluid friction clutch is already well-known from publication DE 36 09 376 A1, in which assembly bolts are used, with which the disks can be inserted centered. The assembly bolts are thereby part of a handling facility, by means of which the clutch disks are inserted into the clutch housing. After the use the handling facility as well as the assembly bolt is pulled out of the clutch housing and the inserted disk packet. The guiding of the disks takes place thereby in the clutch housing by suitable profiling provided in the housing inner wall. With this solution the disks are on the one hand guided loosely on the assembly bolt, whereby the handling facility has to be particularly designed, built and manufactured for the desired installation case. Furthermore the handling facility is also to be adapted to the disks. With this solution a localization of the position of the individual disks to each other in radial direction can be made, however a complex threading of the individual disks is necessary in particular for the dismantling of the whole disk packet respectively the complete clutch.

A friction clutch unit is already well-known from publication DE-US 39 16 726, consisting of a clutch and a clutch disk, whereby the clutch exhibits a spring device, like a disk spring swivel mounted on the lid, that is supported at the lid and that loads a pressure plate in the direction of a back pressure plate—like a flywheel—, and in which in the condition of the Unit mounted at the back pressure plate the clutch disk can be clamped between pressure plate and back pressure plate. The clutch and the clutch disk are thereby before being mounted onto the back pressure plate assembled to one unit by means of a mounting auxiliary tool and are then mounted together onto the back pressure plate. With this solution the clutch and the clutch disk can be assembled as one unit by the clutch manufacturer and can be treated in this form as an individual unit. However it is also here necessary that the mounting auxiliary tool is designed particularly for the specific application. Furthermore this design is only suitable for the mounting of a clutch disk to a clutch and not for a disk packet.

A pre-mounted disk packet is furthermore already well known from the publication DE 39 27 584 C1. In this solution the disks are held in distance to each other by means of distance strips. The distance strips extend thereby over the entire axial length of the disks to be distanced of a disk packet. With this solution rotating distance rings are not necessary. However also for this a separate device is required, in order to position the distance strips on the outer or inner circumference of the disks and to furthermore mount the individual disks onto these. The installation per disk thereby takes place in stationary predetermined positions and the distance strips serve the purpose of the axial position localization of the individual disks. On the one hand a special design of the disks is required in order to achieve the suitable effect in cooperating with the distancing means respectively an auxiliary mounting device is required, in order to locate the individual disks in radial direction regarding their position to each other and to arrange the distancing means. This solution is likewise not suitable for designs with disks that are axially adjustable in the installed condition.

It is therefore the task of the invention to create a method and a device for mounting which replaces the annoying individual assembly of the individual elements at the complete assembly of the entire gearbox and which permits an easy exchangeability of a clutch device or a brake device even during a defect at any part in a transmission component.

SUMMARY OF THE INVENTION

The solution according to the invention is characterized by the characteristics of claims 1, 22, 23, 24 and 25. Favorable embodiments are shown in the sub claims.

According to the invention it is intended to execute the mounting of a multiple disk brake unit or multiple disk clutch unit as a completely mounted disk packet unit. This comprises a disk packet that can be pre-tensioned, to which an auxiliary mounting device is allocated for mounting in the transmission component on a guide element, for example in the shape of rods or tubes, and which is present in the disk packet unit that can be mounted as pre-tensioned disk packet. The disk packet that can be pre-tensioned and that is pre-tensioned in the disk packet unit that can be mounted comprises at least two elements that are adjacently arranged and that form frictional surfaces, which can be connected in a frictional engagement with one another by means of an intermediate element that forms a frictional surface. With a multiplicity of elements that form frictional surfaces at least one spring device is provided between two adjacent arranged elements that form frictional surfaces. The intermediate elements that form frictional surfaces do not exhibit a guide element in the disk packet unit that can be mounted. The auxiliary mounting device comprises at least one sleeve element for guiding the elements that form frictional surfaces and the spring devices arranged between the same. The elements that form frictional surfaces comprise in addition, depending upon the number of used sleeve elements, a passage allocated to a sleeve element. A stop is allocated to the sleeve in the area of an end. Furthermore the auxiliary mounting device comprises at least one tensioning device that can be connected detachable with a sleeve element for generating the pre-tension of the disk packet. For this purpose the entire disk packet is under application of force shifted respectively compressed towards the stop. The value of the pre-tensioning is thereby dimensioned in such a manner that static friction results between the intermediate elements and the elements that form frictional surfaces. This means that the intermediate elements are kind of clamped between The elements that form frictional surfaces. A special guide for the intermediate elements can then be omitted during handling of the disk packet unit. The solution according to one form of the invention offers the benefit that the entire completely pre-mounted disk packet, both external and internal disks—can be mounted and also again be removed with the sleeve element on a rod suspension described above in form of the disk packet unit that can be mounted. The internal contour of the sleeve element must correspond thereby only to the outer contour of the guide element. Preferably both are designed with a circular cross section and at least a clearance fit or no fit at all is provided between the outer circumference of the guide element and the inner circumference of the sleeve element. A benefit is that the sleeve can be mounted easily on the rod-shaped guide element. It is substantial that the sleeve can be mounted easily on the rod-shaped guide element.

The term "form frictional surfaces" thereby means that on the one hand the faces of the elements exhibit at least partially the areas necessary for the realization of a frictional engagement, which are involved in the friction pairing. Thereby the frictional surface is formed either directly by the face of the element or intermediate element or however is formed by a friction lining that is applied on the faces of these elements and which extends over at least a portion of the face.

When providing several sleeves the passages for guiding provided at the elements that form frictional surfaces are preferably arranged on a joint diameter. These can be arranged—depending upon arrangement of the guide elements in the transmission component—in circumferential direction in uniform distance or in nonuniform distance. A design with an arrangement of the passages on different diameters is however also conceivable.

The number of sleeve elements with tensioning device can be limited to a minimum related to the number of guide elements. For optimal clamping at least two elements are necessary, which are offset to each other in circumferential direction at least by an angle of more than 90°, preferably by an angle of about 180°.

The mounting of the mounted disk packet unit takes place as a complete packet in the pre-tensioned condition of the disk, i.e., together with the auxiliary mounting device. This means for the transmission component that only the guide element and the guide element necessary for the intermediate elements, for example in form of an internal gear or a profile shalt or an accordingly designed internal tooth internal gear for a design of the intermediate elements being external disks, are to be provided. The pre-tensioned disk packet is pushed together with the sleeve onto the guide element and the tensioning device is released after localization. Thereby the pre-tensioned disk packet is released and the disks assume a position corresponding to the unloaded condition. The sleeve element is then only to be located in axial direction respectively the disk in the largest distance from the stop element is to be secured in axial direction, whereby this securing is preferably designed in such a manner that it permits at the same time also the securing of the entire disk packet in this direction in regards to the sleeve. The tensioning device can be completely removed or actuated in such a manner that the pre-tensioning is neutralized.

The disk packet unit is suitable both for application in multiple disk clutches and multiple disk brake devices, whereby the latter represent the preferential area of application. For this the sleeve element is mounted either on a stationary mounted guide element, for example a rod mounted in the housing, while for designs for clutch devices the guide element is always joined secured against tension with a rotating element.

The elements that form frictional surfaces are thereby preferably designed as external disks. In this case the intermediate elements are formed by internal disks, which exhibit means within the range of their inside diameter for the realization of an interlocking connection with a further guide element in the gearbox, whereby this guide element is formed for example by a profiled shaft or an internal gear. No special demands are thereby to be made about the design of the external disks.

A further possibility is to design the elements that form frictional surfaces as internal disks. In this case the external disks are formed by the intermediate elements that form frictional surfaces. The internal disks are thereby guided on the sleeve element, while the external disks are clamped between the internal disks during assembly. Guiding of the external disks takes place at a guide element in the gearbox, for example the internal contour of the housing of a transmission component via the accordingly complementary design of the external disks at the outside diameter. These exhibit preferably projecting parts and recesses, which engage in recesses and projecting parts at the internal contour of the housing that are designed accordingly complementary and extend in axial direction over the length of the gearbox.

The solution according to the invention offers the benefit that the elements that form frictional surfaces are arranged regarding their position coaxially to the sleeve element and are adjusted in radial direction. This applies also to the intermediate elements. When providing only one sleeve element a clearance fit should consist between the elements that form frictional surfaces and the outer contour of the sleeve element; when providing several sleeve elements, designing the passages at the elements that form frictional surfaces with a larger diameter than the outside diameter of the sleeve element is sufficient. For the pre-assembly of the disk packet unit however still another auxiliary device can be provided additionally, which adjusts the intermediate elements regarding their position in radial direction in relation to the sleeve elements respectively the elements that form frictional surfaces. This auxiliary device is formed either by a cylindrical element with a corresponding design at the inside diameter, which locates the position of the intermediate elements, when designed as external disks, in radial direction in relation to the elements that form frictional surfaces guided on sleeve elements, while when the intermediate elements are designed as internal disks the cylindrical element locates with its outside diameter the position of the internal disks related to their inside diameter in radial direction in relation to the elements that form frictional surfaces designed as external disks and the sleeve element.

A substantial benefit of the solution according to a form of the invention consists moreover of the fact that the axial overall length can be held in tolerance, i.e., the disk packet can be already prefabricated concerning the axial tolerance of the transmission component.

Under a further aspect of the invention the sleeve element can be surface-treated, and preferably it is hardened. This makes it possible to avoid impacts of the elements that form frictional surfaces and at the same time to do without complex surface treatments and expensive materials for the rod shaped or bar shaped guide elements in a transmission component.

A further substantial benefit of the solution according to a form of the invention consists of the fact that also for a necessary exchange completely pre-adjusted disk packets can be supplied, which can be accommodated in the gearbox in a relatively simple way. If all multiple disk clutch devices respectively multiple disk brake devices, which are allocated to the speed/torque-changing elements, are comprised of mounted disk packet units, then, with the exchange of a certain packet when guiding all gearbox elements at guide elements, each individual disk packet, The tensioning device can have various designs. It can comprise a supporting element that can be connected detachable with the sleeve element, an adjusting element and a force applying device, which can be brought at least indirectly in active connection at the element that can form frictional surfaces of the disk packet that is arranged at the most outside and at the furthest distance from the stop. Adjusting element and force applying device are preferably formed by one element. The force applying device comprises for example a disk spring working outward, to which an adjusting device is allocated or a lock nut, which works together with a thread arranged on the sleeve element, whereby this can also form at the same time the adjusting element. A further possibility consists in the use of a clamping ring respectively a locking ring.

BRIEF DESCRIPTION OF THE DRAWINGS

The solution according to embodiments of the invention is described hereinafter with the help of the following drawings.

DETAILED DESCRIPTION

Figures 1A, 1B:
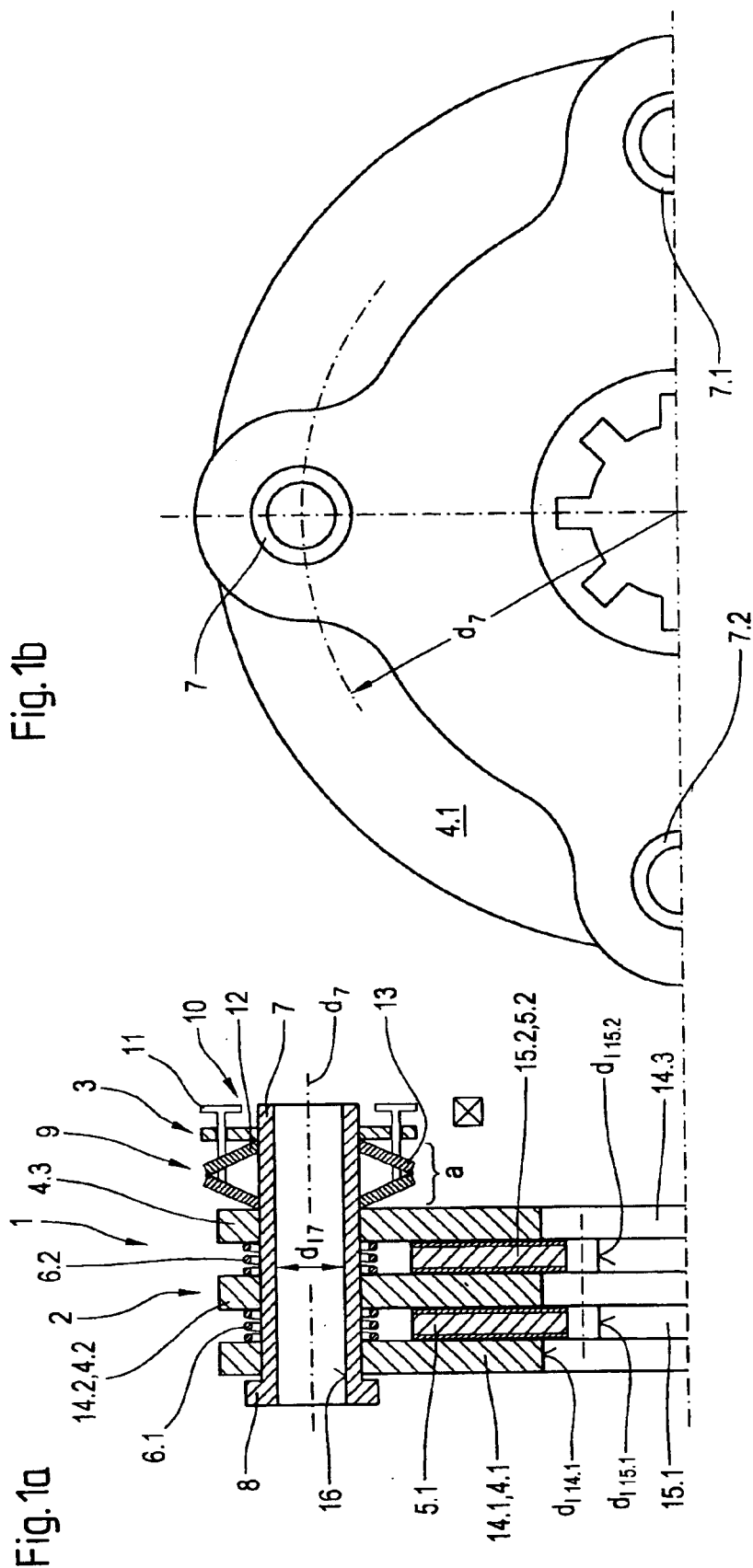
FIGS. 1a and 1b illustrate a design according to the invention of a mounted disk packet unit in diagrammatic simplified views using two different views.

FIG. 1 explains in a diagrammatic simplified view in an axial section a design of a disk packet unit 1 that can be mounted designed according to the invention, comprising a pre-tensioned disk packet 2 and an auxiliary mounting device 3. The pre-tensioned disk packet 2 comprises at least two adjacent arranged elements that form frictional surfaces, here 4.1 to 4.3, which can be connected in a frictional engagement with one another by means of an intermediate element that forms a frictional surface 5. For a design with a multiplicity of elements that form frictional surfaces, like here 4.1 to 4.3, at least one spring device, here 6.1 and 6.2, is arranged between two adjacent arranged elements that form frictional surfaces, here between all adjacent arranged elements that form frictional surfaces 4.1 to 4.3. The auxiliary mounting device 3 comprises a sleeve element 7 for guiding the elements that form frictional surfaces 4.1 to 4.3 and the spring devices arranged between the same, here the spring devices 6.1 and 6.2. A stop element 8 is allocated furthermore to the sleeve element 7, which is designed preferably, as represented in FIG. 1 in section, as one piece with the sleeve element 7. A formation as a separate disk-shaped element, which is permanently connected with the sleeve element 7 or which is connected in such a manner with it that localization in axial direction is given, is also conceivable. The stop element 8 respectively the stop designed in the sleeve element 7 serves the purpose of supporting the pre-tensioned disk packet 2. For the realization of pre-tensioning furthermore a tensioning device 9 is provided, which is guided at the sleeve element 7, is arranged preferably coaxially to the same and becomes effective at the element that forms frictional surfaces, here the element that forms frictional surfaces 4.3, which is guided on the sleeve element 7 at the furthest distance from the stop element 8. In the simplest case the tensioning device 9 comprises a supporting element 10 that is connected detachable with the sleeve element 7 and an adjusting element 11, supporting itself at the supporting element 10, which becomes effective at the element that forms frictional surfaces 4.3 arranged at the furthest distance from the stop element 8, and a force applying device 12, which becomes effective at the adjusting element 11. The adjusting element 11 supports itself thereby via the force applying device 12 at the supporting element 10. The supporting element 10 remains stationary in relation to the sleeve element 7, while the adjusting element 11 can change its position under effect of the force applying device 12. The tensioning device 9 comprises at least two tensioning conditions—a first condition, the released condition and a second condition, represented in FIG. 1, which serves the purpose of pre-tensioning the disk packet 2. Here a disk spring 13 is used as force applying device 12, which supports itself at a supporting element 10 that is connected stationary with the sleeve element 7. The adjusting element 11 serves the purpose of adjusting the range of spring a. The tensioning device 9 can thereby be connected detachable with the sleeve element 7, whereby the connection is made by the connection of the supporting element 10 with the sleeve element 7.

In the design represented in FIG. 1 the elements that form frictional surfaces 4.1 to 4.3 of the pre-tensioned disk packet 2 are external disks 14.1 to 14.3. Their inside diameter $d_{I\ 14.1}$, $d_{I\ 14.2}$ and $d_{I\ 14.3}$ is thereby smaller than the diameter of the arrangement of the sleeve element 7 $d_7$. The sleeve element 7 comprises preferably a circular inside diameter $d_{17}$, which forms in the mounted condition with a guide element of the transmission component at least a clearance fit. The intermediate elements that form frictional surfaces 5, here 5.1 and 5.2, are designed in FIG. 1 as internal disks 15.1 and 15.2. Their outside diameter $d_{A\ 15.1}$, $d_{A\ 15.2}$ is thereby smaller than the internal dimension of the sleeve element 7 in radial direction. The tensioning device 9 generates a force on the disks for the creation of the disk packet unit that can be mounted 1, which permits a static friction between the elements that form frictional surfaces 4.1 to 4.3 and the intermediate elements 5.1 and 5.2. This means that the intermediate elements 5.1 and 5.2, which are designed here as internal disks 5.1 and 5.2, are guided and held, i.e. clamped, in the disk packet unit 1 that can be mounted only by the force of the elements that form frictional surfaces, here the external disks 14.1 to 14.3, created by means of the tensioning device 9. The disk packet unit that can be mounted 1 represented in FIG. 1 can be offered and treated as completely pre-assembled unit as well as mounted onto guide elements in a transmission component. The complex threading of individual disks during the assembly of the transmission component is omitted.

In the design in accordance with FIG. 1 the internal disks 15.1 and 15.2 with their inside diameter $d_{I\,15.1\,to\,15.2}$ are designed in such a manner that they can be connected interlocking with a rotating element of the transmission component, for example a shaft. They exhibit preferably a profiling at their inside diameter. This is illustrated in FIG. 1b in a view from on the right in accordance with FIG. 1a without the tensioning device 9. Furthermore it can be recognized that preferably at least four sleeve elements 7, here represented 7 and 7.1 and 7.2, are provided, which are arranged in circumferential direction on a joint diameter $d_7$ and exhibit same distances to each other in circumferential direction. The number of sleeve elements 7 depends thereby on the number of provided guide elements in the transmission component. This number is preferably between at least 2 and a number equal to or smaller than the number of guide elements. This applies also to the design of the internal contour 16 of the sleeve element 7 as well as their dimensions.

Figure 2:
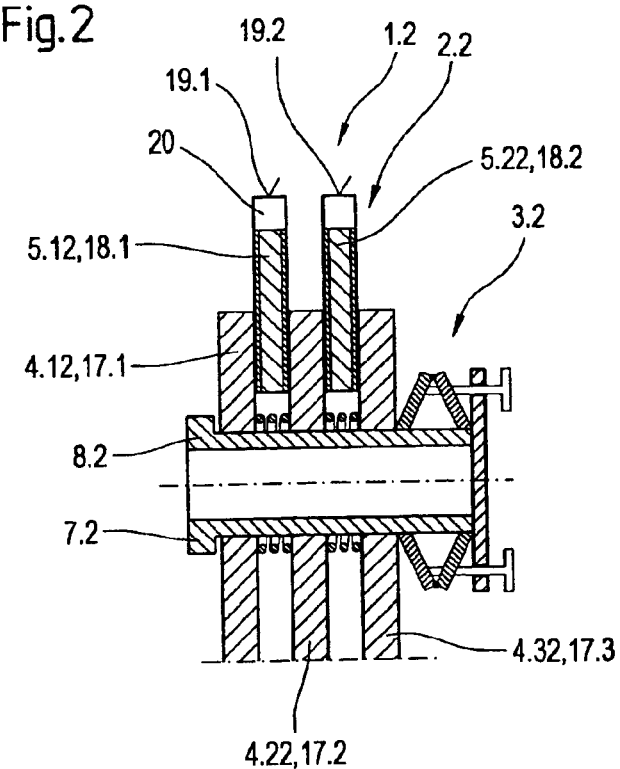
FIG. 2 illustrates an alternative embodiment of FIG. 1 with formation of the elements that form frictional surfaces as internal disks.

FIG. 2 illustrates a further design of a disk packet unit 1.2 that can be mounted with a pre-tensioned disk packet 2.2, an auxiliary mounting device 3.2, whereby the design of the auxiliary mounting device 3.2 essentially corresponds to the one in FIG. 1, which is the reason why it is not referred to any further and same reference symbols are used for same elements. The elements that form frictional surfaces 4.12 to 4.32 are here designed as internal disks 17.1 to 17.3, while the intermediate elements that form frictional surfaces 5.12 to 5.22 are designed as external disks 18.1 to 18.2. The external disks 18.1 to 18.2, which are during the application in multiple disk brakes integrated stationary in the housing, are designed in their outer circumference 19.1 to 19.2 in such a manner that they comprise interlocking entraining elements in form of a profiling 20, which serve the purpose of radially adjusting the external disks 18.1 and 18.2 in a gear-box with corresponding recesses.

The internal disks 17.1 and 17.3 are here guided on a sleeve element 7.2, which likewise has a stop element 8.2 and which can be connected with a tensioning device 9.2. In this design guiding of the internal disks 17.1 to 17.3 takes place in a transmission component at a guide element which is connected secured against tension with a rotating element.

The mounting of the disks to disk packet units 1 respectively 1.2 is thereby effected for example as following described:
1. Adjusting the sleeve elements 7.1, 7.2 in horizontal or vertical direction, preferably over a suitable holding device of an assembly device.
2. Threading the individual elements of the disk packet 2 respectively 2.2 toward the stop, starting with an element that forms frictional surfaces alternating with an intermediate element and possibly spring devices provided between the elements that form frictional surfaces, whereby the intermediate elements are aligned at an auxiliary guide of an assembly device in radial direction
3. Connecting the tensioning device 9 respectively 9.2 with the sleeve element 7 respectively 7.2.
4. Tensioning the individual elements that form frictional surfaces and the intermediate elements against each other, whereby the condition of the static friction is caused between the same.
5. Removing the disk packet unit from the assembly fixture.

Figure 3:
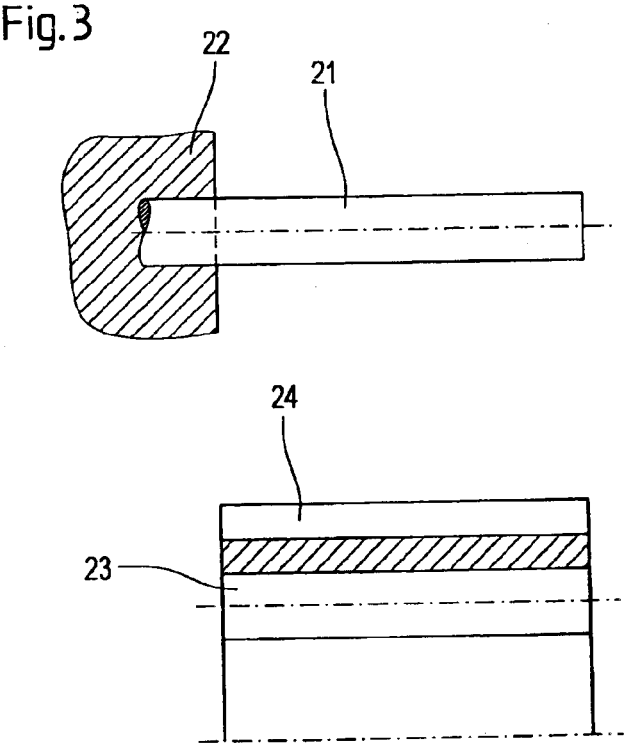
FIG. 3 illustrates the installation situation and the method for mounting of a disk packet unit designed according to the invention.
Figure 4:
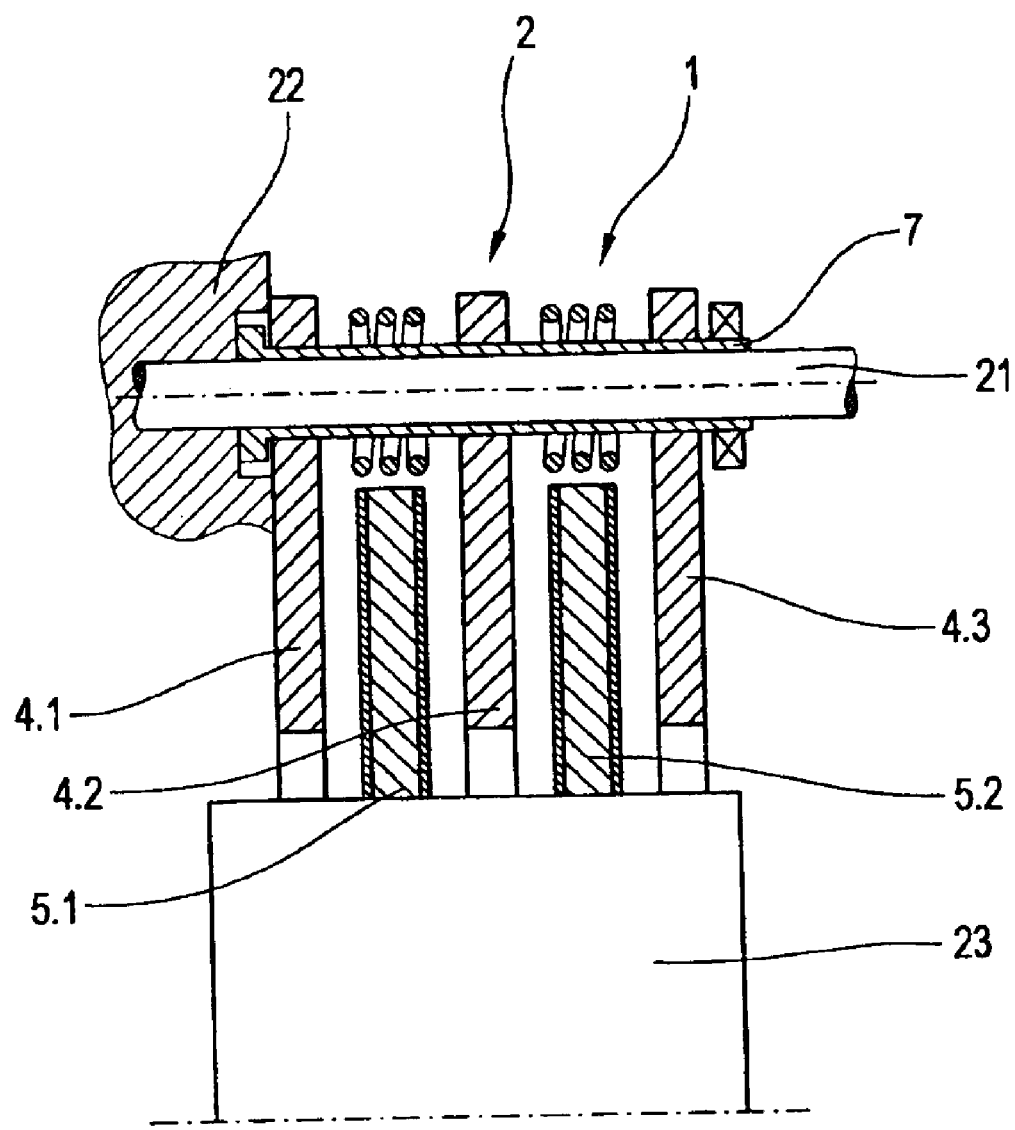
FIG. 4 illustrates the disk packet unit in the mounted condition.

The disk packet unit 1 or 1.2 represented in FIGS. 1 and 2 can be mounted on a guide element 21, which is guided in the housing or for designs in accordance with FIG. 2 with an element connected secured against torsion with a rotary element. This guide element 21 is diagrammatic represented in FIG. 3 and mounted in the housing 22. This guide element is preferably a rod element. For a design in accordance with FIG. 1 of the disk packet unit that can be mounted the guide element 21 is mounted stationary, preferably in the housing of a transmission component. For further installation situations an internal gear 23 is provided, which exhibits a gear-tooth profile 24 at its outside diameter, which can be brought in active connection interlocking with the recesses and projecting parts at the inside diameter $d_{I15.1}$ respectively $d_{I15.2}$ of the internal disks. These two elements represent a possible installation situation, which however can also be modified. The unit that can be mounted is thereby mounted on the guide element 21 as completely pre-assembled unit, whereby the disk packet unit that can be mounted 1 is double guided during assembly, on the one hand by the guide element 21 and the sleeve element 7 as well as by the intermediate elements 5.1 and 5.2 functioning as internal disks 14.1 to 14.2 within the range of their inside diameter $d_{I\,15.1\,to\,15.2}$ at the internal gear 23. Only after mounting and after the axial localization within the range of the stop element 8 of the sleeve element 7 the loosening of the tensioning device 9 takes place, whereby the individual external disks 14.1 to 14.3 remain guided on the guide element 7. FIG. 4 illustrates in contrast to this the installation condition, whereby it is evident that the individual disks—internal and external disks—take on a non-contact relationship to each other in the unloaded condition.

The guide element 21 can thereby be a rod shaped or pipe shaped element of arbitrary cross section, which extends over a portion of the axial extension of the transmission component or over the entire overall length. In the latter case for the individual brake devices a sequential mounting of disk packet units 1 on the guide elements takes place during the assembly of the transmission component.

REFERENCE SYMBOL LIST

1; 1.2 Disk packet unit that can be mounted
2; 2.2 Pre-tensioned disk packet
3; 3.2 Auxiliary mounting device
4; 4.1,
4.2, 4.3;
4.12, 4.22,
4.32 Elements that form frictional surfaces
5.1, 5.2;
5.12, 5.22 intermediate element that forms a frictional surface
6.1, 6.2 Spring device
7.1, 7.2 Sleeve element
8.1, 8.2 Stop element
9, 9.2 Tensioning device
10 Supporting element
11 Adjusting element
12 Force applying device
13 Disk spring 14.1, 14.2,
14.3 External disks
15.1, 15.2 Internal disks
16 Internal contour
17.1, 17.2,
17.3 Internal disks
18.1, 18.2,
18.3 External disks
19.1, 19.2 Outer circumference
20 Profiling
21 Guide element
22 Housing
23 Internal gear
24 Profile
a Range of spring
$d_{I\ 14.1,\ 14.2,\ 14.3}$ Inside diameter of the external disks
$d_{A\ 15.1,\ 15.2}$ Outside diameter of the internal disks
$d_{e7}$ Diameter of internal radial extension of the sleeve element
$d_7$ diameter, on which the sleeve element is arranged

We claim:

1. A disk packet that can be mounted on a guide element of a transmission component, comprising:
   a pre-tensioned disk packet comprising at least two adjacent arranged elements that form frictional surfaces which can be connected in a frictional engagement with one another by means of an intermediate element that forms a frictional surface and an auxiliary mounting device;
   at least one spring device located between said at least two adjacent arranged elements that form frictional surfaces;
   the auxiliary mounting device comprising at least one sleeve element that can be coaxially mounted on the guide element of the transmission component and a tensioning device;
   said elements that form frictional surfaces being guided on the sleeve element;
   the sleeve element comprising a stop; and
   the tensioning device being connected detachable with the sleeve element and creating a force for pre-tensioning the disk packet so that static friction is generated between said elements that form frictional surfaces and the intermediate element.

2. A disk packet unit according to claim 1 wherein the intermediate element does not exhibit a guide a element.

3. A disk packet unit according to claim 1 wherein:
   said elements that form frictional surfaces are external disks;
   the intermediate element is an internal disk.

4. A disk packet unit according to claim 1 wherein:
   the elements that form frictional surfaces are internal disks;
   the intermediate element is an external disk.

5. A disk packet unit according to claim 4 wherein the external disk exhibits within its range of outside diameter a profiling for the realization of an interlocking connection.

6. A disk packet unit according to claim 1 wherein a tensioning device is allocated to the disk packet on a side turned away from the stop.

7. A disk packet unit according to claim 1 wherein:
   the tensioning device comprises a supporting element which is connected detachable with the sleeve element;
   the tensioning device comprises furthermore an adjusting element and a force applying device which can be brought at least indirectly in active connection at the element forming frictional surfaces that is arranged at the most outside and at the furthest distance from the stop.

8. A disk packet unit according to claim 7 wherein the adjusting element and force applying device are formed by one element.

9. A disk packet unit according to claim 7 wherein the force applying device comprises a disk spring working outward.

10. A disk packet unit according to claim 7 wherein the force applying device comprises a lock nut which works together with a thread arranged on the sleeve element.

11. A disk packet unit according claim 7 wherein the adjusting element is formed by a lock nut.

12. A disk packet unit according to claim 7 wherein the force applying device and the adjusting element are formed by a locking ring.

13. A disk packet unit according to claim 1 wherein the sleeve element and the stop are designed as one-piece units.

14. A disk packet unit according to claim 1 wherein:
    a plurality of said elements that form frictional surfaces is provided;
    a said spring device is provided at least between the first two elements that form frictional surfaces adjacent in the direction of static friction-causing force.

15. A disk packet unit according to claim 14 wherein each said spring device includes at lease one spring with the characteristics of a characteristic line of an essentially constant force course over a certain range of spring.

16. A disk packet unit according to claim 14 wherein the spring device is designed as a shaft spring washer or a conical spring or coil spring.

17. A disk packet unit according to claim 1 wherein the sleeve element has an essentially circular ring-shaped cross section.

18. A disk packet unit according to claim 1 wherein the dimension of the spring element in axial direction corresponds at least to the dimension of the elements that form frictional surfaces and the intermediate element arranged one behind the other in the relieved condition.

19. A disk packet unit according to claim 1 wherein the auxiliary mounting device comprises a plurality of sleeve elements.

20. A disk packet unit according to claim 19 wherein the plurality of sleeve elements is arranged on a joint diameter of the elements that form frictional surfaces with the same distance to each other in the circumferential direction.

21. A disk packet unit according to claim 19 including a tensioning device allocated to each sleeve element.

22. A method for assembling the disk packet unit of claim 1 comprising:
    by means of an auxiliary device, adjusting the position of a plurality of the intermediate elements such that the positions of the auxiliary device and the intermediate elements are localized relative to each other;
    slipping a first element that forms frictional surfaces on the sleeve element and then slipping a first element that forms frictional surfaces on the guide element;
    alternately slipping the intermediate elements and the elements that form frictional surfaces on the sleeve element and the auxiliary device;
    connecting and activating the tensioning device with the sleeve element for tensioning of the elements that form frictional surfaces and the intermediate elements to create a condition of static friction between the elements; and
    removing the auxiliary device.

23. The method of claim 22 wherein the tensioning device is removed and the disk packet is secured in axial direction.

* * * * *